June 27, 1961  R. J. BREHM ET AL  2,989,925
WATER PUMP ASSEMBLY
Filed Dec. 21, 1956
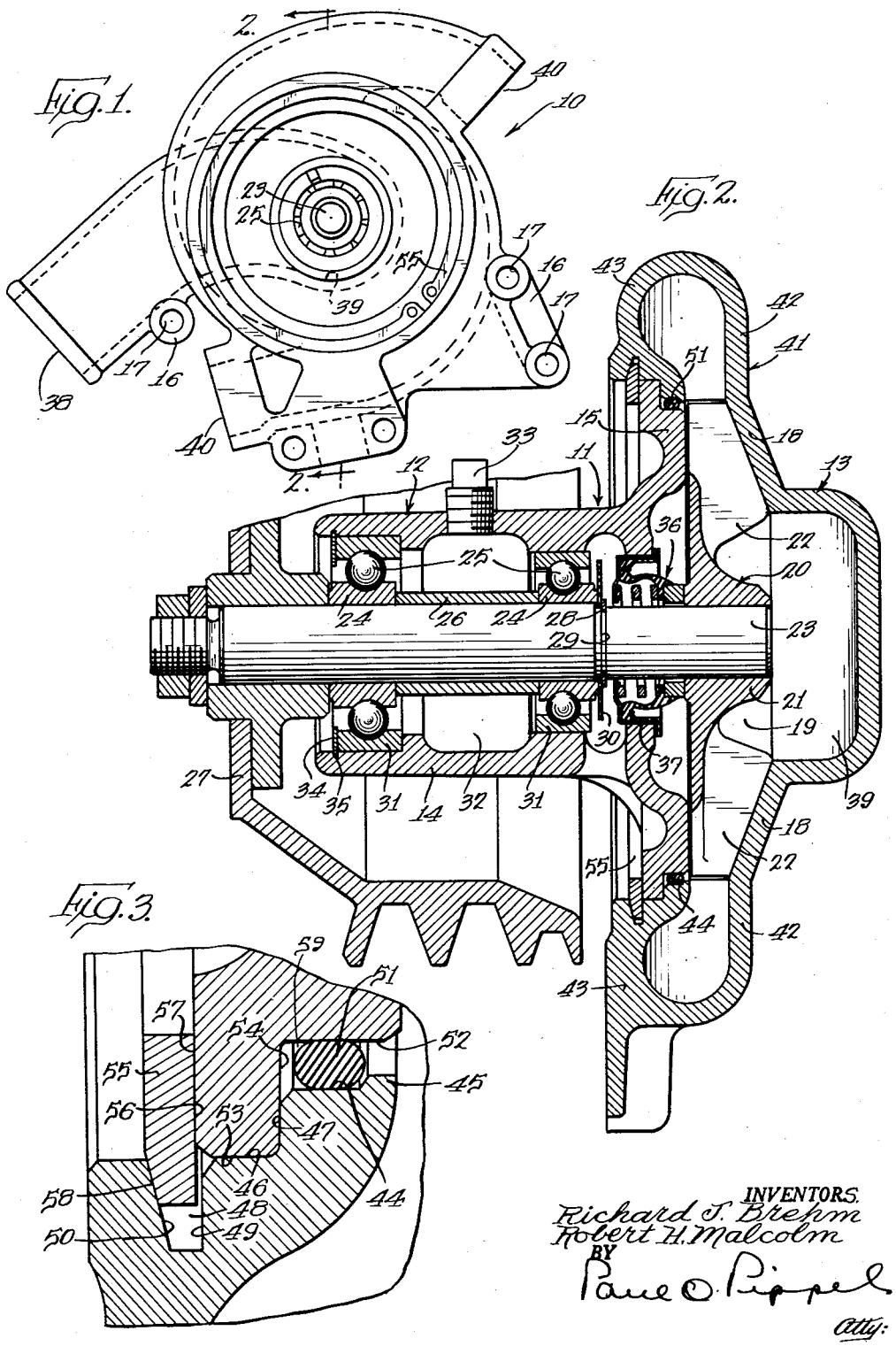
INVENTORS.
Richard J. Brehm
Robert H. Malcolm
BY
Paul O. Pippel
Atty:

United States Patent Office 2,989,925
Patented June 27, 1961

---

2,989,925
WATER PUMP ASSEMBLY
Richard J. Brehm and Robert H. Malcolm, Fort Wayne, Ind., assignors to International Harvester Company, a corporation of New Jersey
Filed Dec. 21, 1956, Ser. No. 629,996
6 Claims. (Cl. 103—103)

This invention relates to pumps and more particularly to a new and improved water pump assembly of the type employed for circulating cooling water through the cooling system of an internal combustion engine.

Centrifugal pumps of the type for circulating cooling liquids through the cooling systems of engines used for motor vehicle propulsion heretofore include housing structures which take the form of elongated cylindrical bearing sections for rotatably supporting the pump shafts integrally formed with an enlarged fluid chamber in which the impeller is located. Suitable sealing means are provided between the fluid chamber bearing section without leakage of the lubricating oil for the pump shaft into the cooling water or liquid to thereby be carried inside the engine cooling system. The outer end of the fluid chamber is generally covered by means of an end plate secured to the pump housing by means of a plurality of bolts. In order to prevent leakage of the cooling water from the fluid chamber exteriorly a gasket is provided between the abutting surfaces of the end plate and the pump housing through which the end plate securing bolts pass. It will be appreciated that each time the pump was overhauled it was necessary to replace the gasket disposed between the end plate and the pump housing. Furthermore, because of the liquid pressure developed by the pump in operation leakage between the gasket and the end plate and pump housing was oftentimes experienced. Furthermore, the bolts which were used to mount the water pump upon the engine also extend through the end plate gasket, to further lessen the sealing qualities of the gasket. It is therefore an important object of the present invention to provide a new and improved housing structure for a liquid pump which does not utilize bolts or other fastening means which extends through the end plate and pump housing seal.

When the engine becomes heated to a fairly high temperature the pump shaft, housing and associated parts expand. Since certain parts are made of metal they expand to a greater degree than the sealing means utilized between the pump end plate and housing. Thus leakage of fluid from the pump housing past the sealing means occurs. It is therefore another object of the invention to provide a pump housing sealing means which will not leak and which will provide an effective seal regardless of the temperature condition of the engine and the pump parts.

A still further object of the invention is to provide a water pump of simple, durable and inexpensive construction.

A further object of the invention is to provide a cooling water pump in which the possibility of leakage of the cooling water therefrom is at a minimum.

A still further object is to provide a new and improved pump which is adapted to be economically manufactured and which is so designed as to permit the manufacture and assembly thereof in accordance with present day large scale mass production manufacturing methods of construction and assembly.

The foregoing and other important objects and desirable features inherent in and encompassed by the invention together with many of the purposes and uses thereof will become readily apparent from a reading of the ensuing description in conjunction with the annexed drawings in which:

FIGURE 1 is an end elevational view of a water pump embodying the invention;

FIGURE 2 is a cross sectional view taken substantially along line 2—2 of FIGURE 1, and FIGURE 3 is an enlarged fragmentary sectional view of the connection between two parts of the pump casing Referring to the drawings in detail wherein like reference characters represent like elements throughout the various views. A water pump designated generally by numeral 10 is shown. The water pump 10 includes a two piece pump casing 11, the two pieces of the pump casing 11 being designated by numerals 12 and 13, respectively Pump casing part 12 is formed with an elongated generally cylindrical bearing section 14 having a radially extending flange 15 integrally formed on one end thereof as shown in FIGURE 2. Integrally formed on the pump casing part 13 are a plurality of tabs 16 provided with apertures 17 for receiving bolts, not shown, which are threaded into the engine block, cylinder head or other supporting structure. The flange 15 and an inclined wall section 18 of the casing part 13 partially define a generally frusto-conical pumping chamber 19.

Disposed within the pumping chamber 19 is an impeller 20 which includes a hub 21 and a plurality of radially extending blades or vanes 22 integrally formed with the hub. The hub is pressed on one end of a drive shaft 23. The inner races 24 of a pair of anti-friction bearings 25 are also pressed on the drive shaft 23 and are maintained in a particular actually spaced relationship by means of a spacer sleeve 26. The end of the pump shaft 23 opposite the impeller 20 projects beyond the end of the elongated cylindrical bearing section 14 and has a pulley 27 suitably secured thereon. The pulley 27 is adapted to be driven by the fan belt of the internal combustion engine, not shown. The pulley 27 is hollow as indicated in FIGURE 2 and encircles the elongated bearing section 14. The shaft 23 has a groove 28 therein for receiving a snap ring 29 An oil slinger ring 30 abuts the snap ring 29 and the inner race 24 of one of the bearings 25 in turn is bottomed on the oil slinger ring With the impeller 20 disposed within the pumping chamber 19 the outer races 31 of the anti-friction bearings 25 are adapted to slidingly engage respective interior annular surfaces of the bearing section 14. The space 32 enclosed by the bearing section 14 between the anti-friction bearings 25 serves as a lubricant reservoir. The lubricant reservoir 32 is provided with a suitable fitting 33 by which the lubricant in the space 32 may be easily replenished. The shaft assembly including the bearings 25 i held in place within the pump casing 11 by means of a retaining snap ring 34 which is expanded into a groove 35 adjacent one end of the elongated bearing section 14 and is adapted to abut the outer race 31 of an adjacent bearing 25. In order to prevent leakage of water from the pumping chamber 19 and/or leakage of lubricant into the pumping chamber a mechanical seal designated generally by numeral 36 is provided for sealing the inner periphery 37 of the radial flange 15 and the hub 21 of the impeller 20.

Integrally formed with the pump casing part 13 is an inlet conduit 38 which has one end 39 terminating adjacent to and in communication with a central area of the pumping chamber 19. Also integrally formed with the inclined wall section 18 of the pump casing part 13 are tangentially disposed outlet conduits 40 which are in communication with the peripheral region of the pumping chamber 19.

Each outlet conduit 40 has a circumferential length equal to one-half the outer periphery of the pumping chamber 19 and is defined by a substantially U-shaped shroud member section. The shroud member section are integrally formed to provide an annular shroud mem ber 41. One leg 42 of the shroud member 41 is disposed substantially in a plane normal to the axis of rotation of the pump shaft 23 and is integrally formed with the outer peripheral edge of the inclined wall section 18 of the pump casing part 13 as shown in FIGURE 2. The other leg 43 also extends radially inwardly. The inner periphery of the leg 43 is partially defined by a continuous annular surface 44. Extending radially inwardly from one axial end of the annular surface 43 is an annular lip 45, the purpose of which will be explained hereinafter. The inner periphery of the leg 43 is further provided with an annular surface 46 coaxial with annular surface 43 but of greater internal diameter than the annular surface 45. The junction between the annular surfaces 44 and 46 is defined by a radially extending shoulder 47. A radially extending annular groove 48 is formed in the leg 43 intermediate the axial ends of the annular surface 46. One side wall 49 of the groove 48 lies in a plane perpendicular to the axis of rotation of the drive shaft 23 and the other side wall 50 and the other annular side wall 50 of the groove extends radially outwardly toward the other side wall 49 whereby the axial length of the bottom of the groove 48 is less than the axial length of the opening of the groove.

In use the pump casing 13 is supported on the engine by means of attaching bolts extending through the apertures 17. It will be noted that the tabs 16 through which the apertures 17 extend are not in communication with the interior of the pumping chamber 19. Thus the problem of sealing the attaching bolts is eliminated. The impeller 20 and the drive shaft 23 together with the bearings 25 and the seal 36 are pre-assembled in the pump casing part 12. An O-ring 51 of rubber or like material is mounted on an annular surface 50 partially defining the outer periphery of the flange 15. It will be noted that the diameter of the annular surface 52 is less than the diameter of the annular surface 44 to provide an annular space 59 when the pump casing parts 12 and 13 are assembled together. The outer periphery of the flange 15 is also partially defined by an annular surface 53 which is coaxial with the annular surface 52 and has a diameter substantially equal to the diameter of the annular surface 46. The juncture between the annular surfaces 52 and 53 is in the form of a radially extending surface 54. The pre-assembled unit with the O-ring mounted on the annular surface 52 is then advanced axially until the impeller 20 is disposed within the accompanying chamber 19. When in this position the surface 54 abuts the surface 47 of the leg 42 and the surface 53 engages the surface 46. The diameter of the cross-sectional area of the O-ring 51 in its unassembled state is greater than the radial length of the space 59 between the surface 44 and the surface 52. When the pump casing parts 12 and 13 are assembled together the O-ring 51 which is disposed within the space 59 is consequently compressed between the surfaces 52 and 44 and the cross-section of the O-ring 51 assumes an oval shape as best shown in FIGURE 3. A lip 45 prevents the O-ring from being dislodged from between the surfaces 52 and 44 during the assembly operation. From the foregoing it will be appreciated that the lip 45 and the radially extending surface 54 maintain the O-ring 51 within the space 59 and the O-ring 51 serves to effectively seal the juncture between the pump. It will be noted that the axial length of the surface 53 is slightly greater than the axial length of the annular surface 46 engaged thereby such that a portion thereof overhangs the side wall 49 of the groove 48. A snap ring 55 is employed for maintaining the pump casing parts 12 and 13 in their assembled relationship and the celing ring 51 compressed between the surfaces 52 and 44. The ring 55 is made of resilient material and possesses the characteristic of being able to expand radially. One side 56 of the snap ring 55 is flat and is adapted to abut the flat annular surface 57 spaced from and parallel to the surface 54 and defining the axial end of the annular surface 53 opposite the axial end defined by the surface 54. The side of the snap ring 55 opposite the side 56 is provided with a tapered surface 58 which is adapted to engage the inclined side wall 50 defining the groove 48. It will be appreciated that as the snap ring 55 expands radially outwardly it also moves axially in the direction of the annular surface 47 and inasmuch as the snap ring also engages the annular surface 57, the entire preassembled pump casing unit is resiliently urged toward the right as viewed in FIGURE 2 to maintain the surfaces 54 and 47 tightly in engagement with each other. From the foregoing it will be appreciated that the present invention eliminates the need for securing bolts to fasten the pump casing parts 12 and 13 together as well as the gasket generally disposed between such parts through which the securing bolts generally passed. Furthermore, the pump may be quickly and easily assembled or disassembled for repair, adjustment or overhaul.

The embodiment of the invention chosen for the purposes of description and illustration herein is that preferred for achieving the objects of the invention and developing the utility thereof in a most desirable manner. Due regard being had to existing factors of economy, simplicity of design and construction, production methods and the improvements sought to be effected. It will be appreciated, therefore, that the particular structural and functional aspects emphasized herein are not in turn to exclude but rather to suggest other modifications and adaptations of the invention as fall within the spirit and scope of the invention as defined in the appended claims.

We claim:

1. A pump assembly comprising a housing including first and second parts, said first part being adapted to rotatably support a pump shaft, said first part having an axially extending, annular sealing surface on one end thereof and an axially extending annular supported surface adjacent to and of greater diameter than said annular sealing surface, said second part having a wall provided with a central circular opening having a diameter greater than the diameter of said annular sealing surface and in which said first part is axially insertable, said opening being defined by an annular sealing surface, said annular sealing surfaces being in radial alignment and radially spaced with respect to each other to provide an annular space, said wall further having an annular supporting surface adjacent to said annular sealing surface of said second part, said annular supporting surface of said second part having a diameter greater than the diameter of said annular sealing surface of said second part and being adapted to slidingly engage the annular supported surface of said first part; sealing means disposed within said annular space between said annular sealing surfaces; cooperable surfaces on said first and second parts adapted to engage each other to limit axial insertion of said first part in said opening whereby said annular sealing surfaces are in radial alignment, said cooperable surface of said first part extending radially between and interconnecting axial ends of said annular sealing surface and said annular supported surface of said first part and said cooperable surface of said second part extending radially between and interconnecting axial ends of said annular sealing surface and said annular supporting surface of said second part, and means for resiliently urging said cooperable surfaces of said first and second parts into engagement with each other and for maintaining said annular sealing surfaces substantially in radial alignment.

2. A pump assembly according to claim 1, including means for preventing axial dislodgement of said sealing means from between said annular sealing surfaces in one direction comprising an annular lip extending radially inwardly from one end of the annular sealing surface of said second part, the innermost peripheral edge of said lip being radially spaced outwardly from said annular sealing surface of said first part.

3. A pump assembly comprising a housing defining a pumping chamber, said housing including a bearing section and a shroud member, said bearing section being adapted to rotatably support a pump shaft and having a generally radially extending wall on one end thereof, the periphery of said radially extending wall having an annular sealing surface and an axially extending annular supported surface adjacent thereto of greater diameter than said annular sealing surface, said wall further having a radially extending annular abutment surface interconnecting the adjacent axial ends of said annular supported surface and said annular sealing surface, said shroud member having a wall provided with a central circular opening having a diameter greater than the diameter of said annular sealing surface but less than the diameter of said annular supported surface, said opening being defined by an annular sealing surface, said shroud member wall further having an annular supporting surface adjacent to said annular sealing surface and a radially extending abutment surface interconnecting axial ends of said annular sealing surface and said annular supporting surface of said shroud member, said annular supporting surface of said shroud member being adapted to slidingly engage the annular supported surface of said bearing section whereby said sealing surfaces are in radial alignment and radially spaced with respect to each other to provide an annular space and said radially extending abutment surfaces engage each other to limit axial sliding movement of said annular supported surface with respect to said annular supporting surface; means for resiliently urging said annular abutment surfaces into engagement with each other; and a ring of resilient material disposed within said annular space and compressed between said annular sealing surfaces.

4. A pump assembly according to claim 3, in which, means are provided for preventing axial dislodgement of said sealing ring from said radial space in one axial direction including an annular lip extending radially inwardly from one axial end of said shroud member wall annular sealing surface.

5. A pump assembly according to claim 3, in which, said means for resiliently urging said abutment surfaces into engagement with each other includes an annular radially extending groove formed in said supporting surface of said shroud member intermediate the axially spaced ends thereof, one wall defining said groove lying in a radial plane parallel to said abutment surface of said shroud member and another wall of said groove being inclined and extending radially outwardly from said supporting surface and axially toward said radial surface of said groove, and a snap ring resiliently expanded into said groove having an inclined wall adapted to engage the inclined wall of said groove and having a flat annular wall adapted to abut said radially extending wall of said bearing section whereby the resilient action of said snap ring to expand in said groove causes said abutment surfaces to be resiliently urged together.

6. A pump assembly comprising a housing including first and second parts, said first part being adapted to rotatably support a pump shaft, said first part having an axially extending, annular surface on one end thereof, said second part having a wall provided with a central circular opening in which said first part is axially insertable, said opening having a diameter greater than the diameter of said annular surface and being defined by an annular surface; sealing means disposed between said annular surfaces; cooperable means on said first and second parts for limiting axial insertion of said first part in said opening whereby said annular surfaces are in radial alignment, said cooperable means including a surface extending radially from one end of said annular surface of said first part and a surface extending radially from the end of the annular surface of said second part, said radially extending surfaces being adapted to abut each other to limit axial insertion of said first part into said opening of said second part; means for detachably connecting said first and second parts together; and means for preventing axial dislodgement of said sealing means from between said annular surfaces in one direction comprising an annular lip extending radially inwardly from the end of said annular surface of said second part opposite said radially extending surface.

References Cited in the file of this patent
UNITED STATES PATENTS

| 1,555,023 | Prokofieff | Sept. 29, 1925 |
| 1,661,325 | Derrick | Mar. 6, 1928 |
| 2,554,536 | Miller | May 29, 1951 |
| 2,658,453 | Walters | Nov. 10, 1953 |
| 2,678,606 | Watson | May 18, 1954 |
| 2,745,351 | Zozulin | May 15, 1956 |
| 2,747,513 | Atkinson | May 29, 1956 |
| 2,777,395 | Disbrow | Jan. 15, 1957 |
| 2,824,523 | Campbell et al. | Feb. 25, 1958 |
| 2,845,873 | Lapsley | Aug. 5, 1958 |

FOREIGN PATENTS

| 84,617 | Sweden | Oct. 15, 1935 |
| 1,071,310 | France | Mar. 3, 1954 |